United States Patent
Kobe et al.

[11] 3,846,423
[45] Nov. 5, 1974

[54] PYRAZOLO (1,5A) 1,3,5-TRIAZINES

[75] Inventors: Joze Kobe, Costa Mesa; Robert H. Springer, Santa Ana; Darrell E. O'Brien, Mission Viejo, all of Calif.

[73] Assignee: ICN Pharmaceuticals, Inc., Pasadena, Calif.

[22] Filed: June 8, 1972

[21] Appl. No.: 260,850

[52] U.S. Cl...... 260/248 NS, 260/249.9, 260/249.5, 260/310 R, 424/249
[51] Int. Cl............................................ C07d 57/34
[58] Field of Search................. 260/248 NS, 249.5

[56] References Cited
UNITED STATES PATENTS
3,549,631   12/1970   Lewis et al..................... 260/249.5

*Primary Examiner*—John M. Ford
*Attorney, Agent, or Firm*—Lyon & Lyon

[57] ABSTRACT

Pyrazolo[1,5a]1,3,5-triazines are disclosed which are useful as inhibitors of phosphodiesterase enzymes or intermediate in the production process. Such triazines are of the following general structure:

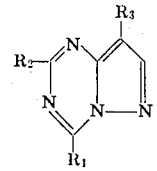

wherein $R_1$, $R_2$ and $R_3$ are as defined hereinafter, or heterocyclic derivatives thereof. Also disclosed are substituted pyrazole derivatives which are used to prepare the pyrazolo[1,5a]1,3,5-triazines of this invention.

19 Claims, No Drawings

PYRAZOLO (1,5A) 1,3,5-TRIAZINES

BACKGROUND OF THE INVENTION

As reported by Sutherland et al in "Cyclic AMP," Am. Rev. Biochem. 37, 149 (1968), cyclic adenosine monophosphate (C-AMP) has been established as an intracellular "second messenger," mediating many of the actions of a variety of different hormones. According to this theory, first messenger hormones, epinephrine and norepinephrine, influence adenyl cyclase contained at or within cell walls to form intracellularly cyclic AMP from adenosine triphosphate upon receipt of the extra-cellular hormone signal. The formed cyclic AMP in turn functions as a second messenger and stimulates intracellular functions particular to the target cells of the hormone. Cyclic AMP has thus been shown to "activate" protein kinases, which in turn produce physiological effects such as muscle contraction, glycogenolysis, steriodogenisis and lipolysis.

Cyclic AMP is degraded, however, in vivo by phosphodiesterase enzymes, which catalyze hydrolysis of the cyclic purine nucleotide to 5'-adenosine monophosphate with a consequent loss of function. It has accordingly been suggested that substituted cyclic AMP analogs which are more resistant to phosphodiesterase degradation than the naturally occurring cyclic nucleotide might be administered in aid of lagging cellular processes. Synthetic production of such compounds, however, is quite costly. It would be advantageous, therefore, to enhance the beneficial effects of naturally produced cyclic AMP by administering compounds which are capable of inhibiting the undesirable effects of phosphodiesterase enzymes.

Sutherland et al, in Circulation 37, 279 (1968), suggest that the pharmacological effects of theophylline, which has the structure

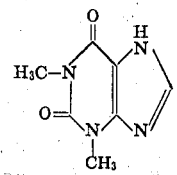

are the result of its ability to inhibit the action of phosphodiesterase enzymes. Theophylline has thus been employed in lieu of the adenyl cyclase-stimulating hormones, epinephrine and norepinephrine, as a heart stimulant following cardiac arrest and in refractory asthma cases as a bronchial dilator. Theophylline, however, does not selectively inhibit phosphodiesterase, but rather gives general stimulation to the central nervous system. Accordingly, the use of theophylline can make the recipient nervous and irritable and can also create cardiovascular effects, i.e., rapid beating. By the same token, theophylline is not as potent a phosphodiesterase inhibitor as is desired and consequently has to be used in larger quantities, which, of course, can further the undesirable effects enumerated above.

As indicated in the application of Darrell E. O'Brien et al, Ser. No. 206,548, entitled "3,5,7-trisubstituted-pyrazolo[1,5a]pyrimidines," assigned to the same assignee as this application, various 5,7-dialkyl- and 5-alkyl- and 5-aralkyl-3,7-disubstitutedpyrazolo[1,5a]-pyrimidines have been found to possess phosphodiesterase inhibition properties. Further investigative efforts have led to the discovery that 2-arylpyrazolo[1,5a]1,3,5-triazines possess significant and selective phosphodiesterase inhibition capability, as set forth in the application of Joze Krobe et al, Ser. No. 232,632, filed Mar. 7, 1972, now abandoned, assigned to the same assignee as this application. This in turn has led to the investigation and evaluation of other pyrazolo[1,5a]triazines, including those of the present invention.

SUMMARY OF THE INVENTION

According to this invention, there are provided phosphodiesterase inhibitors of the structure

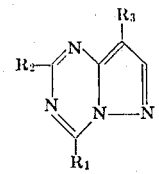

wherein $R_1$ may be hydroxyl, alkoxy, halogen, SH or $SR_4$ where $R_4$ is alkyl or aralkyl, N=N=N, an amine, or alkyl; $R_2$ may be $SR_4$, H, alkyl or an amine; and $R_3$ may be H or halogen, as will be explained in more detail hereinafter. The invention also relates to heterocyclic derivatives of such compounds and to pyrazole derivatives which are used in preparation of such pyrazolo[1,5a]1,3,5-triazines.

Preferably, the alkyl, alkoxy and aralkyl groups in the aforenoted substituents will be linear, branched or substituted $C_1$ to $C_8$, while the amine may be $NH_2$, $NH—NH_2$, $NHR_4$, $N(R_4)_2$, morpholino or piperdino. The heterocyclic derivatives are of the structure

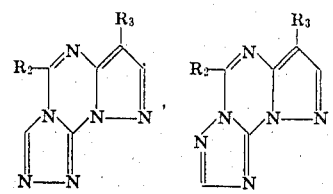

where $R_2$ and $R_3$ are the previously defined substituents.

DETAILED DESCRIPTION OF THE INVENTION

The general procedures utilized to produce the compounds of this invention are shown by the schematic drawings which follow, the pertinent compounds of this invention being indicated by the numerals 1 through 59, inclusive. Various compounds of this invention have been prepared from appropriately substituted pyrazole derivatives which have not been previously described.

The reaction of 3-aminopyrazole with methyl isocyanate, hydrocyanic acid, and with ethoxycarbonylisothiocyanate is shown in Reaction Scheme A. The reaction of methyl isocyanate with 3-aminopyrazole affords a mixture of three products, Compounds 1 - 3, and a fourth product, Compound 4, was obtained by treating Compound 1 with dilute alkali. The structures of these products have been conclusively established by comparing their nuclear magnetic resonance spectral properties (see Table I). The reaction of hydrocyanic acid with 3-aminopyrazole affords one product, Compound 5, which can be isolated, and reaction with ethoxycarbonylisothiocyanate affords Compounds 6 and 7, which have been used as intermediates to prepare derivatives of the pyrazolo[1,5a]1,3,5-triazine ring system.

REACTION SCHEME A

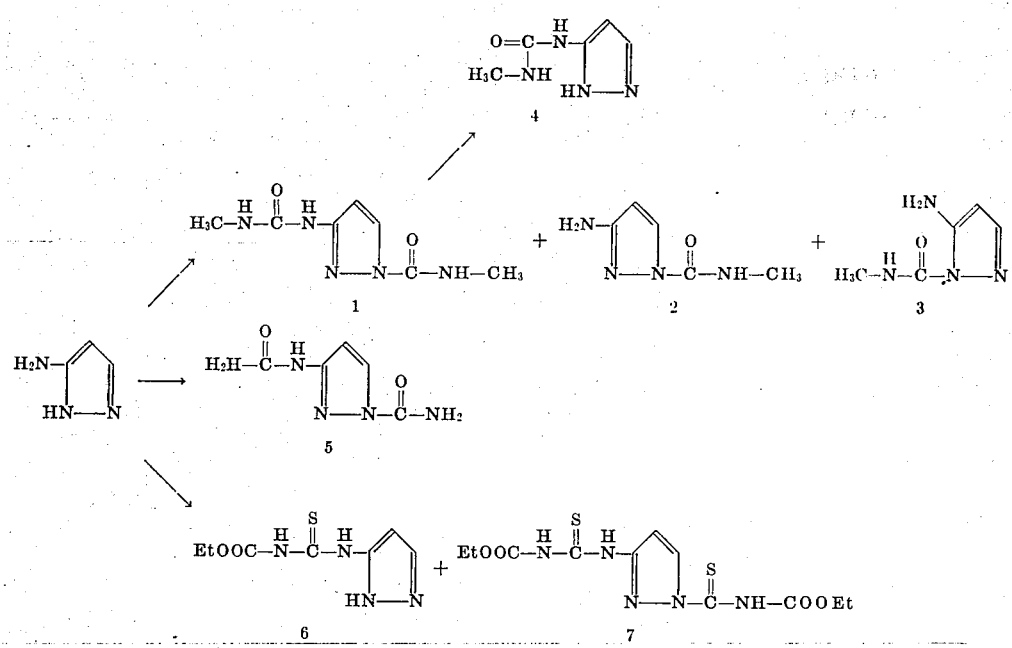

When N-carbethoxy-N'-(3-pyrazolyl)thiourea (Compound 6) or N-carbethoxy-N'-(1-carbethoxythiocarbamoyl-3-pyrazolyl)thiourea (Compound 7) is treated with aqueous alkali or heated at 160° an excellent yield of 5-mercapto-7-hydroxypyrazolo[1,5a]1,3,5-triazine (Compound 8) is obtained. This product is identical in all respects to the product described by L. Capuano, et al. in Chem. Ber., 104, 3039 (1971). The treatment of Compound 8 with an alkyl halide affords the corresponding 5-alkylthio derivative as is exemplified by 7-hydroxy-5-methylthiopyrazolo[1,5a]1,3,5-triazine (Compound 9). Refluxing a solution of 7-hydroxy-5-methylthiopyrazolo[1,5a]1,3,5-triazine (Compound 9) in phosphorus oxychloride readily affords 7-chloro-5-methylthiopyrazolo[1,5a]1,3,5-triazine (Compound 10). As shown in Reaction Scheme B, the treatment of Compound 10 with primary and secondary amines affords the corresponding amino derivatives (Compounds 11 – 13). The reaction of sodium alkoxides with Compound 10 readily yields various 7-alkoxy-5-methylthiopyrazolo[1,5a]1,3,5-triazines (Compounds 14 – 15). Analogously the reaction of Compound 10 with anhydrous potassium hydrosulfide affords 7-mercapto-5-methylthiopyrazolo[1,5a]1,3,5-triazine (Compound 16). The mercapto group of Compound 16 is alkylated when treated with alkyl halides to afford various 7-alkylthio-5-methylthiopyrazolo[1,5a]1,3,5-triazines (Compounds 17 – 18). Alternatively, 7-alkylthio-5-methylthiopyrazolo[1,5a]1,3,5-triazines (Compounds 17 – 18) may be prepared by reacting sodium alkyl mercaptides with 7-chloro-5-methylthiopyrazolo[1,5a]1,3,5-triazine (Compound 10).

REACTION SCHEME B

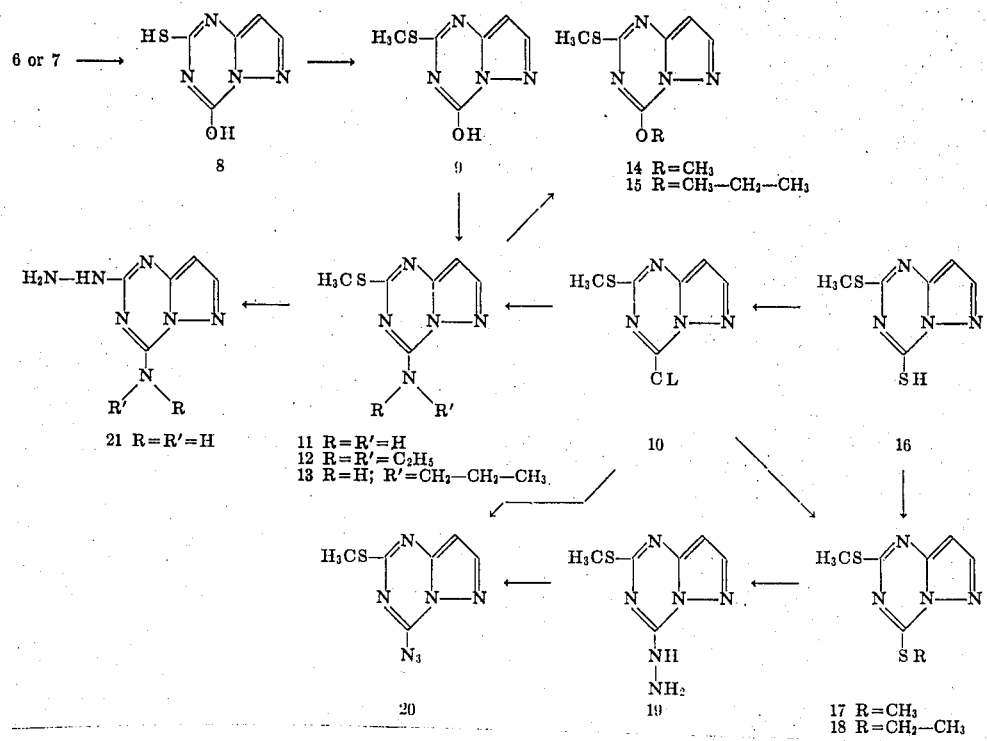

The reaction of 5,7-bismethylthiopyrazolo[1,5a]1,3,5-triazine (Compound 17) with hydrazine hydrate at room temperature results in the formation of 7-hydrazino-5-methylthiopyrazolo[1,5a]1,3,5-triazine (Compound 19). Replacement of the methylthio moiety at position 7 is evidenced by the fact that 7-hydrazino-5-methylthiopyrazolo[1,5a]1,3,5-triazine (Compound 19) is also obtained when hydrazine hydrate is allowed to react with 7-methoxy-5-methylthiopyrazolo[1,5a]1,3,5-triazine (Compound 14). The treatment of 7-hydrazino-5-methylthiopyrazolo[1,5a]1,3,5-triazine (Compound 19) with nitrous acid readily affords 7-azido-5-methylthiopyrazolo[1,5a]1,3,5-triazine (Compound 20) which is identical in all respects to the product obtained by the reaction of sodium azide with 7-chloro-5-methylthiopyrazolo[1,5a]1,3,5-triazine (Compound 10).

Nucleophilic displacement of the methylthio moiety at position 5 under forcing conditions is supported by the fact that when a solution of 7-amino-5-methylthiopyrazolo[1,5a]1,3,5-triazine (Compound 11) in hydrazine hydrate is refluxed for several hours, an excellent yield of 7-amino-5-hydrazinopyrazolo[1,5a]1,3,5-triazine (Compound 21) is obtained.

In Reaction Scheme C, preparation of various 7-substitutedpyrazolo[1,5a]1,3,5-triazines is outlined. The treatment of 7-hydroxy-5-mercaptopyrazolo[1,5a]1,3,5-triazine (Compound 8) with Raney nickel catalyst readily affords 7-hydroxypyrazolo[1,5a]1,3,5-triazine (Compound 22). Additionally the reduction desulfurization of the 7-alkoxy-5-methylthiopyrazolo[1,5a]1,3,5-triazine (Compound 14) with Raney nickel catalyst in ethanol solvent affords 7-ethoxypyrazolo[1,5a]1,3,5-triazine (Compound 23). The ethoxy moiety of Compound 23 is readily replaced by nucleophilic amines to afford various 7-substitutedaminopyrazolo[1,5a]1,3,5-triazines (Compounds 24 – 26). The treatment of 7-hydroxy-5-mercaptopyrazolo[1,5a]1,3,5-triazine (Compound 8) with alkaline peroxide readily affords 5,7-dihydroxypyrazolo[1,5a]1,3,5-triazine (Compound 27).

REACTION SCHEME C

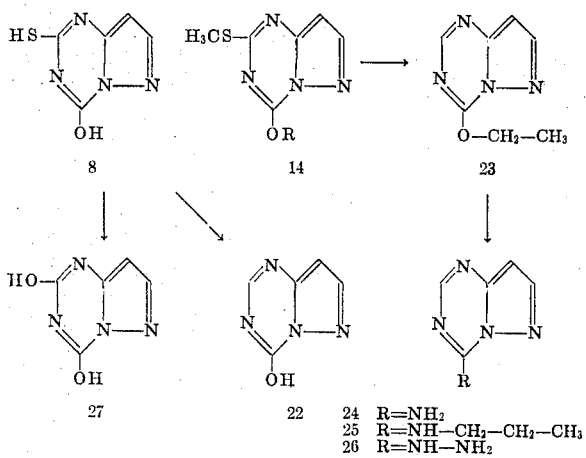

3-bromo-5-methylthio-7-substitutedaminopyrazolo[1,5a]1,3,5-triazines (Compounds 28 – 29). Analogously, treatment of 7-n-propylaminopyrazolo[1,5a]1,3,5-triazine (Compound 25, R = n—$C_3H_7$) with N-bromosuccinimide results in the formation of 3-bromo-7-n-propylaminopyrazolo[1,5a]1,3,5-triazine (Compound 30, where R = n—$C_3H_7$).

REACTION SCHEME D

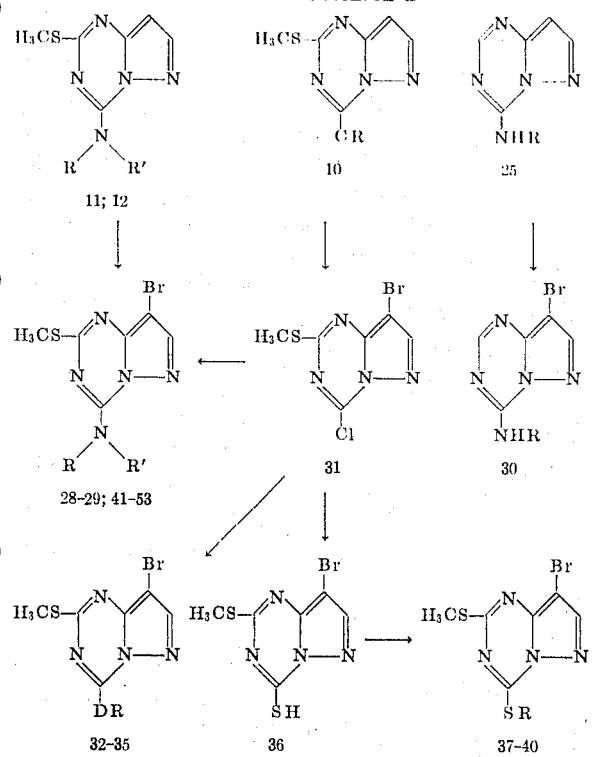

The reaction of N-bromosuccinimide with 7-chloro-5-methylthiopyrazolo[1,5a]1,3,5-triazine (Compound 10) affords 3-bromo-7-chloro-5-methylthiopyrazolo[1,5a]1,3,5-triazine (Compound 31). The reaction of Compound 31 with aqueous sodium hydroxide solution affords 3-bromo-7-hydroxy-5-methylthiopyrazolo[1,5a]1,3,5-triazine (Compound 32, where R = H). Analogously, the reaction of 3-bromo-7-chloro-5-methylthiopyrazolo[1,5a]1,3,5-triazine (Compound 31) with various alcohols containing a catalytic amount of sodium bicarbonate results in the formation of 7-alkoxy-3-bromo-5-methylthiopyrazolo[1,5a]1,3,5-triazines (Compounds 37 – 40).

The facile displacement of the chloro moiety of 3-bromo-7-chloro-5-methylthiopyrazolo[1,5a]1,3,5-triazine (Compound 31) with various primary and secondary amines at ambient temperatures results in the formation of numerous 3-bromo-5-methylthio-7-substituedaminopyrazolo[1,5a]1,3,5-triazines (Compounds 41 – 53). The products obtained by this nucleophilic displacement procedure are identical in all respects to the products obtained by the previously described bromination procedure.

The preparation of various 7-alkyl-5-substituted pyrazolo[1,5a]1,3,5-triazines is shown in Reaction Scheme E. The reductive dehalogenation of 7-chloro-5-methylthiopyrazolo[1,5a]1,3,5-triazine (Compound 10) with palladium on charcoal catalyst in the presence of calcium oxide affords 5-methylthiopyrazolo[1,5a]1,3,5-triazine (Compound 54) in 50–60 percent The pyrazolo[1,5a]1,3,5-triazine ring system undergoes electrophilic attack at position 3. In Reaction Scheme D, the bromination of various pyrazolo[1,5a]1,3,5-triazines is outlined. The treatment of the 5-methylthio-7-substitutedaminopyrazolo[1,5a]1,3,5-triazines (Compounds 11 and 12) with N-bromosuccinimide readily affords the corresponding yields. The treatment of 5-methylthiopyrazolo[1-,5a]1,3,5-triazine (Compound 54) with aqueous sodium hydroxide results in a cleavage of the triazine ring system and S-methyl-N-(3-pyrazolyl)thiourea (Compound 55) is obtained in good yields. The facile cyclization of S-methyl-N-(3-pyrazolyl)thiourea (Compound 55) with various carbonyl derivatives to afford 7-alkyl-5-methylthiopyrazolo[1,5a]1,3,5-triazine derivatives (Compound 56) is exemplified by the fact that refluxing a solution of Compound 55 in triethyl orthoacetate affords 7-methyl-5-methylthiopyrazolo[1-,5a]1,3,5-triazine (Compound 56, where R = CH₃).

REACTION SCHEME E

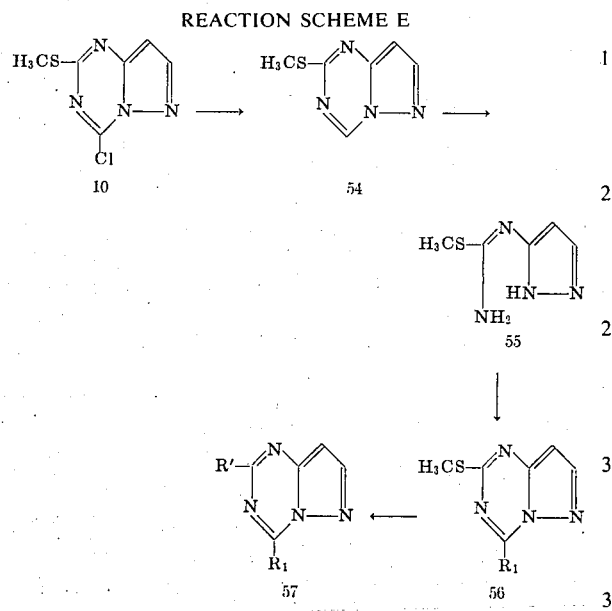

The nucleophilic displacement of the methylthio moiety of the 7-alkyl-5-methylthiopyrazolo[1,5a]1,3,5-triazines (Compound 56) affords various 7-alkyl-5-substitutedpyrazolo[1,5a]1,3,5-triazines (Compound 57). Thus, when 7-methyl-5-methylthiopyrazolo[1-,5a]1,3,5-triazine (Compound 56, where R = CH₃) is refluxed with hydrazine hydrate, an excellent yield of 5-hydrazino-7-methylpyrazolo [1,5a]1,3,5-triazine (Compound 57, where R = CH₃ and R' = NH—NH₂) is obtained.

The utilization of various pyrazolo[1,5a]1,3,5-triazines to form heterocyclic derivatives is shown in Reaction Scheme F. When a solution of 7-hydrazino-5-methylthiopyrazolo[1,5a]1,3,5-triazine (Compound 19) in diethoxymethylacetate is heated, an excellent yield of 5-methylthiotriazolo[3,4g]pyrazolo[1-,5a]1,3,5triazine (Compound 58) is obtained. Rearrangement of this ring system to the closely related triazolo[2,3g]pyrazolo[1,5a]1,3,5-triazine ring system (Compound 59) was found to occur under numerous conditions. An example of this rearrangement is provided by the fact that when Compound 58 is warmed with hydrazine hydrate, an excellent yield of 5-hydrazinotriazolo[2,3g]pyrazolo[1,5a]1,3,5-triazine (Compound 59, where R = NH—NH₂) is obtained.

The invention is further described and illustrated in the following examples, in which all parts and percentages are by weight and all temperatures in degrees Centrigrade unless otherwise indicated. Melting points were taken on a Thomas-Hoover melting point apparatus and are uncorrected. The nuclear magnetic reso-

REACTION SCHEME F

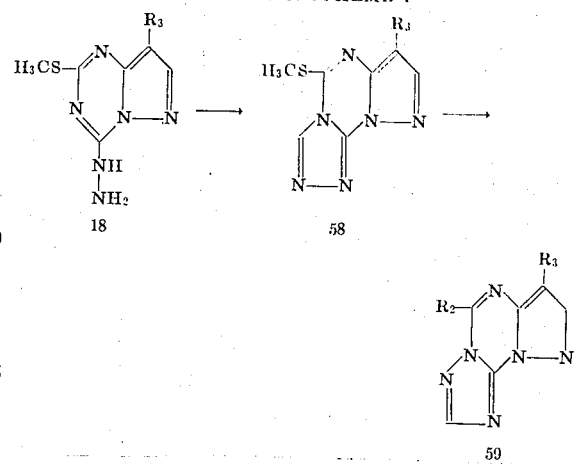

nance spectra was determined on a Hitachi Perkin-Elmer R-20A high resolution nuclear magnetic resonance spectrophotometer. All hydrogenations were carried out on a Parr hydrogenator at room temperature and at a starting pressure of 42 lbs/in² of hydrogen. All samples displayed a single spot on thin layer chromatography and were analyzed by the Heterocyclic Chemical Corporation of Harrisonville, Missouri.

EXAMPLE I

REACTION OF 3-AMINOPYRAZOLE WITH METHYLISOCYANATE

A solution of 3-aminopyrazole [8.3 g, 0.1 mole] in 30 ml of ethylacetate was cooled to −10° C and with good stirring methylisocyanate [6.5 g, 0.114 mole] was added dropwise. After the addition was complete the solution was stirred at −5° for 1 hour and then at room temperature for 16 hours. During this time a white crystalline product had separated. This product was separated by filtration and dried. Recrystallization from ethylacetate afforded 1.8 g of analytically pure N-methyl-N'-[1-(N-methylcarbamoyl)-3-pyrazolyl] urea (Compound 1) that had a melting point of 205°–207°.

Anal. Calc'd for C₇H₁₁N₅O₂: C, 42.63; H, 5.62; N, 35.52.

Found: C, 42.39; H, 5.86; N, 35.79.

The filtrate from the reaction mixture was evaporated to dryness in vacuo. The residue (10.8 g) was purified by column chromatography on silica gel (100 g) utilizing chloroform as the solvent. Fractions from the 300–500 ml elution was evaporated to afford 4.5 g of analytically pure 1-(N-methylcarbamoyl)-3-aminopyrazole (Compound 2) that had a melting point 80°–82°.

Anal. Calc'd for C₅H₈N₄O: C, 42.85; H, 5.75; N, 39.98.

Found: C, 42.83; H, 5.86; N, 40.09.

Evaporation of the fractions from the 700–1,000 ml elution afforded 600 mg of analytically pure 2-(N-methylcarbamoyl)-3-aminopyrazole (Compound 3) that had a melting point of 63°–65°.

Anal. Calc'd for C₅H₈N₄O: C, 42.85; H, 5.75; N, 39.98.

Found: C, 42.98; H, 5.71; N, 40.05.

A solution of N-methyl-N'-[1-(N-methylcarbamoyl)-3-pyrazolyl] urea (Compound 1) [400 mg] in 5 ml of 2N sodium hydroxide was stirred at room temperature for 24 hours. The pH of this solution was adjusted to 7 by the addition of concentrated hydrochloric acid and the precipitated N-methyl-N'-(3-pyrazolyl)urea (Compound 4) was separated by filtration. This product had a melting point of 210°–211° and was found to be analytically pure.

Anal. Calc'd for $C_5H_8N_4O$: C, 42.85; H, 5.75; N, 39.98.
Found: C, 42.81; H, 5.87; N, 39.82.

The structural assignments for these products are based on their nuclear magnetic resonance spectral properties (see Table I).

EXAMPLE II

REACTION OF 3-AMINOPYRAZOLE WITH POTASSIUM CYANATE UNDER ACIDIC CONDITIONS

A solution of 3-aminopyrazole [2.05 g, 40.6 mmoles] in 38.1 ml of 0.66N hydrochloric acid was treated with potassium cyanate [2.0 g, 40.6 mmoles] and the resulting mixture stirred overnight at room temperature. The precipitate was separated by filtration and dried. Recrystallization from water affords 600 mg of analytically pure N-(1-carbamoyl-3-pyrazolyl)urea (Compound 5) that had a melting point of 213°–215° dec.

Anal. Calc'd for $C_5H_7N_5O_2$: C, 35.20; H, 4.77; N, 41.41.
Found: C, 35.30; H, 4.87; N, 41.53.

The structural assignment of this product is based on the nuclear magnetic resonance spectral data (see Table I).

EXAMPLE III

REACTION OF 3-AMINOPYRAZOLE WITH ETHOXYCARBONYLISOTHIOCYANATE

A solution of 3-aminopyrazole [20.75 g, 0.25 mole] in 150 ml of ethylacetate and 750 ml of benzene was cooled to 5°. With good stirring, a solution of ethoxycarbonylisothiocyanate [32.79 g, 0.25 mole] in 250 ml of benzene was added dropwise to the cold solution. The addition was carried out during the period of 60 minutes keeping the temperature at 5° ± 2°. After the addition was complete the mixture was allowed to stir at room temperature for 16 hours. The precipitated product was separated by filtration, dried, and recrystallized from ethylacetate-n-hexane to afford 26.0 g (49 percent) of analytically pure N-carbethoxy-N'-(3-pyrazolyl)thiourea (Compound 6) that had a melting point of 158°–159°.

Anal. Calc'd for $C_7H_{10}N_4O_2S$: C, 39.25; H, 4.71; N, 26.16; S, 14.94.
Found: C, 38.98; H, 4.73; N, 26.18; S, 15.03.

The filtrate from the above was evaporated to dryness, and the residue titurated with 25 ml of ethyl acetate. This crude product weighed 20 g and was composed of 2 major components as adjudged by thin layer chromatography on silica gel plates utilizing a solvent system of chloroform: ethylacetate (9:1). A 1.8 g sample of this crude product was subjected to column chromatography on 80 g of silica gel and eluted with chloroform. Fractions from the 150–225 ml elution afforded 1.15 g of analytically pure N-carbethoxy-N'-(1-carbethoxy-carbamoyl-3-pyrazolyl) thiourea (Compound 7) that had a melting point of 146°–148°.

Anal. Calc'd for $C_{11}H_{15}N_5O_4S_2$: C, 38.26; H, 4.38; N, 20.29; S, 18.53.
Found: C, 38.06; H, 4.22; N, 20.12; S, 18.62.

Fractions from the 300–500 ml elution afforded 400 mg of analytically pure N-carbethoxy-N'-(3-pyrazolyl)thiourea (Compound 6) with a melting point of 158°–159°.

The total yield of N-carbethoxy-N'-(3-pyrazolyl)thiourea (Compound 6) is 59 percent and the yield of N-carbethoxy-N'-(1-carbethoxycarbamoyl-3-pyrazolyl)thiourea (Compound 7) is 15 percent.

The structural assignments for these products are based on their nuclear magnetic resonance spectral properties (see Table I).

TABLE I

PROTON MAGNETIC RESONANCE SPECTRAL DATA, COMPOUNDS 1–7[a]

| δDSS[b] | $H_4$ | $H_5$ | Exchangeable Protons | $J_{4,5}$ |
|---|---|---|---|---|
| Compound 1 | 7.25 | 8.14 | 9.15; 8.2; 7.35 | 2.9 |
| Compound 2 | 5.80 | 7.94 | 7.6; 5.3 (2 protons) | 2.8 |
| Compound 3 | 5.32 | 7.30 | 8.0; 7.4 (2 protons) | 1.8 |
| Compound 4 | 6.58 | 7.07 | 12.1; 8.78; 6.85 | 2.5 |
| Compound 5 | 6.27 | 8.11 | 9.06; 7.71 (2 protons); 6.28 (2 protons) | 3.0 |
| Compound 6 | 7.03 | 7.71 | 12.8; 12.1; 11.3 | 2.4 |
| Compound 7 | 7.45 | 8.75 | 12.2; 11.7; 11.3 | 3.2 |

[a] Solvent: DMSO-$D_6$
[b] DDS = Sodium 2,2-dimethyl-2-silapentane-5-sulfonate

EXAMPLE IV

PREPARATION OF 7-HYDROXY-5-MERCAPTOPYRAZOLO[1,5a]1,3,5-TRIAZINE (COMPOUND 8)

METHOD A

A solution of N-carbethoxy-N'-(3-pyrazolyl) thiourea (Compound 6) [26.0 g, 0.121 mole] in 250 ml of 2N sodium hydroxide was stirred at room temperature. This solution was acidified to pH 1 by the addition of 2N sulfuric acid. The light yellow product was separated by filtration, dried, and recrystallized from water to afford 19.3 g (96 percent) of analytically pure 7-hydroxy-5-mercaptopyrazolo[1,5a]1,3,5-triazine (Compound 8) that had a melting point of 297°–299°.

Anal. Calc'd for $C_5H_4N_4SO$: C, 35.72; H, 2.40; N, 33.33; S, 19.10.
Found: C, 35.72; H, 2.37; N, 33.49; S, 19.17.

METHOD B

A suspension of N-carbethoxy-N'-(3-pyrazolyl) thiourea (Compound 6) [1.07 g, 5 mmoles] in 1.1 g of diethylene glycol was heated at 160°–190° for 15 minutes and then allowed to cool to room temperature. The white crystalline product was separated by filtration, washed with ethanol, and recrystallized from water to afford 150 mg (18 percent) of analytically pure product that is identical in all respects to the product isolated from Method A.

METHOD C

A solution of N-carbethoxy-N'-(1-carbethoxycarbamoyl-3-pyrazolyl)thiourea (Compound 7) [250 mg, 0.72 mmoles] in 2 ml of 2N sodium hydroxide was stirred overnight and the solution acidified to pH 1 by the addition of 2N sulfuric acid. The precipitated product, 60 mg (45 percent), was identical in all respects to the product isolated by Method A.

METHOD D

Heating N-carbethoxy-N'-(1-carbethoxycarbamoyl-3-pyrazolyl)thiourea (Compound 7) [270 mg, 0.78 mmoles] at 180° for 15 minutes results in a melting with effervescense followed by a resolidification. This solid was titurated with ethyl acetate, dried, and recrystallized from water to afford 60 mg (43 percent) of analytically pure 7-hydroxy-5-mercaptopyrazolo[1,5a]1,3,5-triazine (Compound 8) which is identical in all respects to the product prepared by Method A.

EXAMPLE V

PREPARATION OF 7-HYDROXY-5-METHYLTHIOPYRAZOLO[1,5a]1,3,5-TRIAZINE (COMPOUND 9)

A solution of 7-hydroxy-5-mercaptopyrazolo[1,5a]1,3,5-triazine (Compound 8) [1.45 g, 8.65 mmoles] in 35 ml of absolute ethanol and 10 ml of 1.73N sodium hydroxide solution was stirred at room temperature while methyl iodide [1.23 g, 8.65 mmoles] was added dropwise. 10 minutes after the addition was complete the white sodium salt of the product began to precipitate. This mixture was stirred an additional 20 minutes and the sodium salt was separated by filtration. This sodium salt was dissolved in a minimum amount of water and acidified with 2N sulfuric acid. The precipitated product was separated by filtration and recrystallized from aqueous ethanol to afford 1.4 g (90 percent) of analytically pure product that had a melting point of 255°–257°.

Anal. Calc'd for $C_6H_6N_4OS$: C, 39.56; H, 3.32; N, 30.76; S, 17.55.

Found: C, 39.60; H, 3.34; N, 30.97; S, 17.76.

EXAMPLE VI

PREPARATION OF 7-CHLORO-5-METHYLTHIOPYRAZOLO[1,5a]1,3,5-TRIAZINE (COMPOUND 10)

A mixture of 7-hydroxy-5-methylthiopyrazolo[1,5a]1,3,5-triazine (Compound 9) [15.0 g, 0.082 mole], 225 ml of phosphorous oxychloride, and 5 ml of N,N-dimethylaniline was heated at reflux for 2 hours, at which time a complete solution was obtained. The excess phosphorus oxychloride was removed in vacuo and the syrup residue was added slowly to crushed ice (750 g) with good stirring. The light orange crystals were collected by filtration, washed with water, air dried, and recrystallized from n-heptane to yield 11.4 g (70 percent) of analytically pure 7-chloro-5-methylthiopyrazolo[1,5a]1,3,5-triazine (Compound 10) that had a melting point of 130°–132°.

Anal. Calc'd for $C_6H_5N_4SCl$: C, 35.89; H, 2.51; N, 27.93; S, 15.98; Cl, 17.67.

C, 35.63; H, 2.70; N, 27.71; S, 16.06; Cl, 17.43.

EXAMPLE VII

PREPARATION OF 7-AMINO-5-METHYLTHIOPYRAZOLO[1,5a]1,3,5-TRIAZINE (COMPOUND 11)

Heat was evolved when 7-chloro-5-methylthiopyrazolo [1,5a]1,3,5-triazine (Compound 10) [2.0 g, 10 mmoles] was added to a solution of 2.8 ml of 28 percent ammonium hydroxide and 10 ml of absolute ethanol. The resulting solution was stirred at room temperature for 15 hours and the white crystalline product was separated by filtration, titurated with water, and dried. Recrystallization from aqueous ethanol afforded 1.61 g (89 percent) of analytically pure 7-amino-5-methythiopyrazolo[1,5a]1,3,5-triazine (Compound 11) that had a melting point of 218°–220°.

Anal. Calc'd for $C_6H_7N_5S$: C, 39.78; H, 3.89; N, 38.66; S, 17.66.

Found: C, 39.85; H, 3.63; N, 38.70; S, 17.77.

EXAMPLE VIII

PREPARATION OF 7-DIETHYLAMINO-5-METHYLTHIOPYRAZOLO[1,5a] 1,3,5-TRIAZINE (COMPOUND 12)

A solution of 7-chloro-5-methylthiopyrazolo[1,5a]1,3,5-triazine (Compound 10) [3.0 g, 15 mmoles] and diethylamine [2.24 g, 30.6 mmoles] in 15 ml of absolute ethanol was stirred at room temperature for 2 hours. At the end of this time the solution was evaporated to dryness and the solid residue washed with cold water and dried. Recrystallization from n-hexane afforded 3.0 g (88 percent) of analytically pure 7-diethylamino-5-methylthiopyrazolo[1,5a]1,3,5-triazine (Compound 12) that had a melting point of 61°–63°.

Anal. Calc'd for $C_9H_{15}N_5S$: C, 50.62; H, 6.37; N, 29.52; S, 13.49.

Found: C, 50.86; H, 6.55; N, 29.92; S, 13.52.

EXAMPLE IX

PREPARATION OF 5-METHYLTHIO-7-n-PROPYLAMINOPYRAZOLO [1,5a]1,3,5-TRIAZINE (COMPOUND 13)

A solution of 7-chloro-5-methylthiopyrazolo[1,5a]1,3,5-triazine (Compound 10) [15 g, 0.075 moles] and n-propylamine [8.85 g, 0.150 moles] in 200 ml of absolute ethanol was stirred at room temperature for 1 hour and then evaporated to dryness in vacuo. The residue was titurated with water and then recrystallized from aqueous ethanol to afford 15 g (90 percent) of analytically pure 5-methylthio-7-n-propylaminopyrazolo[1,5a]1,3,5-triazine (Compound 13) that had a melting point of 73°–75°.

Anal. Calc'd for $C_9H_{13}N_5S$: C, 48.6; H, 5.84; N, 31.4.

Found: C, 48.6; H, 5.86; N, 31.2.

EXAMPLE X

PREPARATION OF 7-METHOXY-5-METHYLTHIOPYRAZOLO[1,5a]1,3,5-TRIAZINE (COMPOUND 14)

7-chloro-5-methylthiopyrazolo[1,5a]1,3,5-triazine (Compound 10) [1.50 g, 7.5 mmoles] was added to a suspension of sodium bicarbonate [0.65 g, 0.0077 formula weights] in 25 ml of methanol. The resulting mixture was refluxed for 2 ½ hours and then evaporated to dryness. The residue was covered with 10 ml of cold water and the white crystalline product separated by filtration. Recrystallization from n-heptane afforded 1.1 g (75 percent) of analytically pure 7-methoxy-5-methylthiopyrazolo[1,5a] 1,3,5-triazine (Compound 14) that had a melting point of 127°–129°.

Anal. Calc'd for $C_7H_8N_4OS$: C, 42.86; H, 4.11; N, 28.56; S, 16.36.

Found: C, 42.63; H, 4.27; N, 28.74; S, 16.43.

EXAMPLE XI

PREPARATION OF 5-METHYLTHIO-7-n-PROPOXYPYRAZOLO[1,5a] 1,3,5-TRIAZINE (COMPOUND 15)

A solution of sodium n-propoxide in n-propanol was prepared by dissolving sodium [290 mg, 0.0126 formula weights] in 20 ml of n-propanol. This solution was stirred at room temperature while 7-chloro-5-methylthiopyrazolo[1,5a]1,3,5-triazine (Compound 10) [2.5 g, 12.5 mmoles] was added. The resulting solution was stirred at room temperature for 1 hour and then evaporated to dryness at reduced pressure. The residue was purified by column chromatography on silica gel (50 g) using a solvent system of petroleum ether (60°–90°): ethyl acetate (7:3). Evaporation of the eluate afforded 1.6 g (57 percent of analytically pure 5-methylthio-7-n-propoxypyrazolo [1,5a]1,3,5-triazine (Compound 15) that had a melting point of 87°–89°.

Anal. Calc'd for $C_9H_{12}N_4OS$: C, 48.47; H, 5.32; N, 25.08.

Found: C, 48.42; H, 5.41; N, 24.92.

EXAMPLE XII

PREPARATION OF 7-MERCAPTO-5-METHYLTHIOPYRAZOLO[1,5a]1,3,5-TRIAZINE (COMPOUND 16)

A solution of potassium hydrosulfide in ethanol was prepared by saturating a solution of potassium hydroxide (1.1 g, 0.02 formula weights) in 30 ml of ethanol with anhydrous hydrogen sulfide. With good stirring, 7-chloro-5-methylthiopyrazolo[1,5a]1,3,5-triazine (Compound 10) [2.00 g, 0.01 mole] was added to the solution, and the resulting mixture heated at reflux for 1 hour. After cooling, the potassium salt of the product was separated by filtration, dissolved in 50 ml of water. Acidification of this water solution with 2N sulfuric acid precipitated the desired product. Recrystallization from aqueous ethanol afforded 1.6 g (80 percent) of analytically pure product that had a melting point of 264°–266°.

Anal. Calc'd for $C_6H_6N_4S_2$: C, 36.37; H, 3.05; N, 28.28; S, 32.30.

Found: C, 36.26; H, 3.03; N, 28.30; S, 32.45.

EXAMPLE XIII

PREPARATION OF 5,7-BISMETHYLTHIOPYRAZOLO[1,5a]1,3,5-TRIAZINE (COMPOUND 17)

A solution of 7-mercapto-5-methylthiopyrazolo [1,5a]1,3,5-triazine (Compound 16) [1.15 g, 5.8 mmoles] in 10 ml of 1.5N sodium hydroxide solution and 20 ml of absolute ethanol was stirred at room temperature and treated with methyl iodide [0.825 g, 5.8 mmoles]. After the addition was complete the mixture was stirred at room temperature and then the product was separated by filtration. Recrystallization from aqueous ethanol afforded 1.0 g (82 percent) of analytically pure 5,7-bismethylthiopyrazolo [1,5a]1,3,5-triazine (Compound 17) that had a melting point of 133°–135°.

Anal. Calc'd for $C_7H_8N_4S_2$: C, 39.62; H, 3.80; N, 26.41; S, 30.16.

Found: C, 39.74; H, 3.88; N, 26.18; S, 30.31.

EXAMPLE XIV

PREPARATION OF 7-ETHYLTHIO-5-METHYLTHIOPYRAZOLO[1,5a]1,3,5-TRIAZINE (COMPOUND 18)

A solution of sodium methoxide in methanol was prepared by dissolving sodium [0.29 g, 0.0126 formula weights] in 20 ml of methanol. With good stirring, ethanethiol [0.45 g, 13.8 mmoles] was added to the sodium methoxide solution. The resulting solution of sodium ethylmercapto was stirred at room temperature for 30 minutes and then treated with 7-chloro-5-methylthiopyrazolo [1,5a]1,3,5-triazine (Compound 10) [2.5 g, 12.5 mmoles]. This solution was stirred at room temperature for 30 minutes and then evaporated to dryness at reduced pressure. The resulting residue was purified by column chromatography on silica gel (50 g) using a solvent system of petroleum ether (60°–90°): ethyl acetate (8:2). Evaporation of the eluate and recrystallization of the residue from n-heptane afforded 1.10 g (49 percent) of analytically pure 7-ethylthio-5-methylthiopyrazolo[1,5a]1,3,5-triazine (Compound 18) that had a melting point of 73°–75°.

Anal. Calc'd for $C_8H_{10}N_4S_2$: C, 42.45; H, 4.45; N, 24.75.

Found: C, 42.38; H, 4.41; N, 24.77.

EXAMPLE XV

PREPARATION OF 7-HYDRAZINO-5-METHYLTHIOPYRAZOLO[1,5a]1,3,5-TRIAZINE (COMPOUND 19)

A solution of 5,7-bismethylthiopyrazolo[1,5a]1,3,5-triazine (Compound 17) [530 mg, 2.5 mmoles] and 0.15 ml of 85 percent hydrazine hydrate in 10 ml of absolute methanol was stirred at room temperature for 1 hour. At the end of this time the mixture was chilled and the product separated by filtration. Recrystallization from methanol afforded 450 mg (92 percent) of analytically pure 7-hydrazino-5-methylthiopyrazolo [1,5a]1,3,5-triazine (Compound 19) that had a melting point of 213°–215°.

Anal. Calc'd for $C_6H_8N_6S$: C, 36.73; H, 4.11; N, 42.84; S, 16.31.

Found: C, 36.71; H, 4.21; N, 42.57; S, 16.41.

Replacement of the methylthio moiety of position 7 by hydrazine is proven by the fact that 7-hydrazino-5-methylthiopyrazolo[1,5a]1,3,5-triazine (Compound 19) is obtained in 90 percent yields when 7-methoxy-5-methylthiopyrazolo [1,5a]1,3,5-triazine (Compound 14) was treated with hydrazine in an analogous manner.

EXAMPLE XVI

PREPARATION OF 7-AZIDO-5-METHYLTHIOPYRAZOLO[1,5a]1,3,5-TRIAZINE (COMPOUND 20)

METHOD A

A suspension of 7-chloro-5-methylthiopyrazolo [1,5a]1,3,5-triazine (Compound 10) [1.00 g, 5 mmoles] and sodium azide [0.70 g, 0.0118 formula weights] in 20 ml of water was stirred at room temperature for 2 hours. The white solid was collected by filtration and dried. This product was found to be sensitive to light with a deep yellow color developing. Recrystallization of this yellow product from aqueous ethanol afforded 950 mg (92 percent) of analytically pure 7-azido-5-methylthiopyrazolo[1,5a]1,3,5-triazine (Compound 20) that was isolated as yellow crystals that had a melting point of 138°–140°.

Anal. Calc'd for $C_6H_5N_7S$: C, 34.78; H, 2.43; N, 47.33; S, 15.45.

Found: C, 34.64; H, 2.36; N, 47.07; S, 15.67.

METHOD B

A solution of 7-hydrazino-5-methylthiopyrazolo[1,5a]1,3,5-triazine (Compound 19) [200 mg, 1.1 mmoles] in 1.6 ml of 2N hydrochloric acid and 2.0 ml of absolute ethanol was cooled to 8°. With good stirring, a solution of sodium nitrite [80 mg, 0.00116 formula weights] in 0.5 ml of water was added dropwise over a period of 5 minutes. After the addition was complete the mixture was stirred at room temperature for 1 hour and the solids collected by filtration. Recrystallization from aqueous ethanol afforded 200 mg (95 percent) of analytically pure 7-azido-5-methylthiopyrazolo[1,5a]1,3,5-triazine (Compound 20) that was identical in all respects to the product obtained by Method A.

EXAMPLE XVII

PREPARATION OF 7-AMINO-5-HYDRAZINOPYRAZOLO[1,5a]1,3,5-TRIAZINE (COMPOUND 21)

A solution of 7-amino-5-methylthiopyrazolo[1,5a]1,3,5-triazine (Compound 11) [0.9 g, 5 mmoles] and 85 percent hydrazine hydrate (1.3 g) in 50 ml of absolute ethanol was refluxed for 24 hours, and then allowed to cool. The crystalline product was separated by filtration, dried, and recrystallized from ethanol to afford 0.7 g (83 percent) of analytically pure 7-amino-5-hydrazinopyrazolo[1,5a]1,3,5-triazine (Compound 21) that had a melting point of 222°–223°.

Anal. Calc'd for $C_5H_7N_7$: C, 36.36; H, 4.27; N, 59.37.

Found: C, 36.25; H, 4.35; N, 59.51.

EXAMPLE XVIII

PREPARATION OF 7-HYDROXYPYRAZOLO[1,5a]1,3,5-TRIAZINE (COMPOUND 22)

Raney nickel [100 g, W. R. Grace catalyst No. 28] was added to a solution of 7-hydroxy-5-mercaptopyrazolo[1,5a]1,3,5-triazine (Compound 8) [12.0 g, 71.5 mmoles] in 550ml of 3 percent ammonium hydroxide. This suspension was stirred and heated at reflux for 1½ hours. The catalyst was separated by filtration of the hot suspension and washed with 200 ml of hot water. The combined filtrate and wash solutions were evaporated to 60 ml and acidified with 2N sulfuric acid. The precipitated product was separated by filtration, dried, and recrystallized from ethylacetate to afford 5.8 g (60 percent) of analytically pure 7-hydroxy-pyrazolo[1,5a]1,3,5-triazine (Compound 22) that had a melting point of 267°–268° (dec).

Anal. Calc'd for $C_5H_5N_4O$: C, 44.12; H, 2.96; N, 41.17.

Found: C, 44.21; H, 3.02; N, 41.25.

EXAMPLE XIX

PREPARATION OF 7-ETHOXYPYRAZOLO[1,5a]1,3,5-TRIAZINE (COMPOUND 23)

To a well washed (absolute ethanol) suspension of Raney nickel [22 g; W. R. Grace catalyst No. 28] in 125 ml of absolute ethanol was added 7-methoxy-5-methylthiopyrazolo[1,5a]1,3,5-triazine (Compound 14) [1.7 g, 8.6 mmoles], and this mixture was refluxed with stirring for 1 hour. The hot suspension was filtered and the solids washed with 100 ml of hot ethanol. The combined ethanol washings and filtrate were evaporated to dryness at 35° in vacuo. Recrystallization of the residue from n-hexane afforded 700 mg (50 percent) of analytically pure product that had a melting point of 50°–52°.

Anal. Calc'd for $C_7H_8N_4O$: C, 51.21; H, 4.91; N, 34.13.

Found: C, 50.90; H, 5.11; N, 34.32.

EXAMPLE XX

PREPARATION OF 7-AMINOPYRAZOLO[1,5a]1,3,5-TRIAZINE (COMPOUND 24)

A mixture of 7-ethoxypyrazolo[1,5a]1,3,5-triazine (Compound 23) [300 mg, 1.8 mmoles] and 28 percent ammonium hydroxide (0.6 ml) in 20 ml of absolute ethanol was heated at reflux for 12 hours. At the end of this time, the solution was evaporated to dryness, and the residue recrystallized from absolute ethanol to afford 200 mg (81 percent) of analytically pure 7-aminopyrazolo[1,5a]1,3,5-triazine (Compound 24) that had a melting point of 204°–205°.

Anal. Calc'd for $C_5H_5N_5$: C, 44.44; H, 3.73; N, 51.83.

Found: C, 44.29; H, 3.54; N, 52.04.

EXAMPLE XXI

PREPARATION OF 7-n-PROPYLAMINOPYRAZOLO[1,5a]1,3,5-TRIAZINE (COMPOUND 25)

A solution of 7-ethoxypyrazolo[1,5a]1,3,5-triazine (Compound 23) [0.82 g, 5 mmoles] in 10 ml of absolute ethanol was treated with n-propylamine [0.30 g, 5 mmoles]. This solution was stirred at room temperature for 2 hours and then evaporated to dryness in vacuo. Recrystallization of the residue from an ethylacetate-n-hexane mixture afforded 850 mg (95 percent) of analytically pure 7-n-propylaminopyrazolo[1,5a]1,3,5-triazine (Compound 25) that had a melting point of 103°–105°.

Anal. Calc'd for $C_8H_{11}N_5$: C, 54.22; H, 6.26; N, 29.52.

Found: C, 54.17; H, 6.32; N, 39.70.

EXAMPLE XXII

PREPARATION OF 7-HYDRAZINOPYRAZOLO[1,5a]1,3,5-TRIAZINE (COMPOUND 26)

A solution of 7-ethoxypyrazolo[1,5a]1,3,5-triazine (Compound 23) [0.182 g, 5 mmoles] and 85 percent hydrazine hydrate (0.3 ml) in 5 ml of anhydrous methanol was stirred at room temperature. After the exothermic reaction had subsided, the white crystalline product began to separate. Stirring was continued for 1 hour and then the mixture was chilled. The crystalline product was separated by filtration, dried, and recrystallized from methanol to afford 600 mg (80 percent) of analytically pure product that had a melting point of 210°–212°.

Anal. Calc'd for $C_5H_6N_6$: C, 39.99; H, 4.03; N, 55.98.

Found: C, 40.18; H, 4.09; N, 56.01.

EXAMPLE XXIII

PREPARATION OF 5,7-DIHYDROXYPYRAZOLO[1,5a]1,3,5-TRIAZINE (COMPOUND 27)

A solution of 7-hydroxy-5-mercaptopyrazolo[1,5a]1,3,5-triazine (Compound 8) [1.68 g, 10 mmoles] in 80 ml of 0.25N sodium hydroxide was cooled to 0°. With good stirring 20 ml of 30 percent hydrogen peroxide was added dropwise to the cold solution. The temperature was maintained at 0° during the addition, and after the addition was complete the solution was stirred at 0° for an additional 15 minutes. The slightly turbid solution was allowed to warm to room temperature and then acidified to pH 1 by the addition of 2N sulfuric acid. This acidic mixture was chilled and the precipitated product separated by filtration. Recrystallization from water afforded 1.10 g (73 percent) of analytically pure 5,7-dihydroxypyrazolo[1,5a]1,3,5-triazine (Compound 27) that had a melting point of 328°–330°.

Anal. Calc'd for $C_5H_4N_4O_2$: C, 39.48; H, 2.65; N, 36.84.
Found: C, 39.37; H, 2.45; N, 36.82.

EXAMPLE XXIV

PREPARATION OF 7-AMINO-3-BROMO-5-METHYLTHIOPYRAZOLO[1,5a]1,3,5-TRIAZINE (COMPOUND 28)

A mixture of 7-amino-5-methylthiopyrazolo[1,5a]1,3,5-triazine (Compound 11) [0.9 g, 5 mmoles] and N-bromosuccinimide [0.9 g, 5.05 mmoles] in 30 ml of chloroform was heated at reflux for 1 hour. This mixture was filtered while hot, and the separated solids were titurated with water and dried. Recrystallization from ethanol afforded 1.10 g (85 percent) of analytically pure product that had a melting point of 268°–270° (dec).
Anal. Calc'd for $C_6H_6N_5SBr$: C, 27.70; H, 2.32; N, 26.93; S, 12.30; Br, 30.72.
Found: C, 27.57; H, 2.28; N, 27.17; S, 12.30; Br, 30.99.

EXAMPLE XXV

PREPARATION OF 3-BROMO-7-DIETHYLAMINO-5-METHYLTHIOPYRAZOLO [1,5a]1,3,5-TRIAZINE (COMPOUND 29)

A mixture of 7-diethylamino-5-methylthiopyrazolo[1,5a]1,3,5-triazine (Compound 12) [1.80 g, 8 mmoles] and N-bromosuccinimide [1.44 g, 8.1 mmoles] in 15 ml of chloroform was heated at reflux for 15 minutes and then allowed to stir at room temperature for 2 hours. The mixture was filtered and the filtrate washed with saturated sodium carbonate solution. The chloroform layer was then evaporated to afford a yellow oil which slowly crystallized. Recrystallization from n-hexane afforded 1.9 g (75 percent) of analytically pure 3-bromo-7-diethylamino-5-methylthiopyrazolo[1,5a]1,3,5-triazine (Compound 29) which had a melting point of 63°–65°.
Anal. Calc'd for $C_{10}H_{14}N_5SBr$: C, 37.97; H, 4.77; N, 22.14; S, 10.14; Br, 25.27.
Found: C, 37.76; H, 4.61; N, 22.08; S, 10.35; Br, 25.14.

EXAMPLE XXVI

PREPARATION OF 3-BROMO-7-n-PROPYLAMINOPYRAZOLO[1,5a]1,3,5-TRIAZINE (COMPOUND 30)

A solution of 7-n-propylaminopyrazolo[1,5a]1,3,5-triazine (Compound 25) [350 mg, 2 mmoles] in 5 ml of chloroform was treated with N-bromo-succinimide [360 mg, 2 mmoles]. The resultant mixture was heated at reflux for 5 minutes, stirred at room temperature for 2 hours, and finally chilled. The solids were removed by filtration and the filtrate washed with saturated sodium carbonate solution, dried over anhydrous sodium sulfate, and evaporated to dryness. The residue was recrystallized from n-hexane to afford 400 mg (78 percent) of analytically pure product that had a melting point of 104°–106°.
Anal. Calc'd for $C_8H_{10}N_5Br$: C, 37.51; H, 3.39; N, 27.34; Br, 31.20.
Found: C, 37.59; H, 3.44; N, 27.44.

EXAMPLE XXVII

PREPARATION OF 3-BROMO-7-CHLORO-5-METHYLTHIOPYRAZOLO[1,5a]1,3,5-TRIAZINE (COMPOUND 31)

A mixture of 7-chloro-5-methylthiopyrazolo[1,5a]1,3,5-triazine (Compound 10) [1.6 g, 8 mmoles] and N-bromosuccinimide [1.42 g, 8 mmoles] in 15 ml chloroform was refluxed for 10 minutes, at which time a complete solution was formed. The solution was stirred at room temperature for 2 hours, and the succinimide that precipitates was separated by filtration. The filtrate was extracted with saturated sodium carbonate solution, and the chloroform layer evaporated to dryness. Recrystallization of the residue from a mixture of ethylacetate-n-hexane afforded 1.7 g (77 percent) of analytically pure 3-bromo-7-chloro-5-methylthiopyrazolo[1,5a] 1,3,5-triazine (Compound 31) that had a melting point of 143°–145°.

Anal. Calc'd for $C_6H_4N_4SBrCl$: C, 25.78; H, 1.44; N, 20.04; S, 11.44.
Found: C, 25.50; H, 1.33; N, 20.27; S, 11.22.

EXAMPLE XXVIII

PREPARATION OF 3-BROMO-7-HYDROXY-5-METHYLTHIOPYRAZOLO [1,5a]1,3,5-TRIAZINE (COMPOUND 32)

A suspension of 3-bromo-7-chloro-5-methylthiopyrazolo [1,5a]1,3,5-triazine (Compound 31) [1.0 g, 3.58 mmoles] in 20 ml of 1.25N sodium hydroxide was stirred at room temperature for 3 hours. At the end of this time the solution was treated with decolorizing carbon and filtered. Acidification of the filtrate to pH 1 by the addition of concentrated hydrochloric acid precipitates the product. Recrystallization from aqueous ethanol affords 400 mg (43 percent) of analytically pure 3-bromo-7-hydroxy-5-methylthiopyrazolo[1,5a]1,3,5-triazine (Compound 32) that had a melting point > 360°.
Anal. Calc'd for $C_6H_5BrN_4OS$: C, 27.60; H, 1.90; N, 21.5.
Found: C, 27.56; H, 1.90; N, 21.68.

EXAMPLE XXIX

PREPARATION OF 7-ALKOXY-3-BROMO-5-METHYLTHIOPYRAZOLO [1,5a]1,3,5-TRIAZINES (COMPOUNDS 33 – 35)
GENERAL PROCEDURE

A solution of 3-bromo-7-chloro-5-methylthiopyrazolo[1,5a]1,3,5-triazine (Compound 31) [2.79 g, 10 mmoles] and sodium bicarbonate [84 mg. 0.01 formula weights] in 200 ml of the appropriate alcohol was stirred and heated at reflux for 1 hour. At the end of this time, the mixture was cooled, filtered, and the filtrate evaporated to dryness. Recrystallization of the residue from n-heptane affords the analytically pure products listed in Table II.

EXAMPLE XXX

PREPARATION OF 3-BROMO-7-MERCAPTO-5-METHYLTHIOPYRAZOLO [1,5a]1,3,5-TRIAZINE (COMPOUND 36)

A mixture of 3-bromo-7-chloro-5-methylthiopyrazolo[[1,5a]1,3,5-triazine (Compound

TABLE II

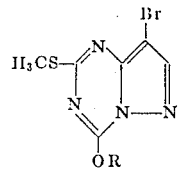

| Compound No. | R | Mp °C | Yield % | Empirical Formula | Calc'd C | Calc'd H | Calc'd N | Found C | Found H | Found N |
|---|---|---|---|---|---|---|---|---|---|---|
| 33 | -CH$_3$ | 157-9 | 73 | C$_7$H$_7$BrN$_4$OS | 30.6 | 2.55 | 20.4 | 30.6 | 2.55 | 20.2 |
| 34 | -CH$_2$-CH$_2$-CH$_3$ | 100-2 | 73 | C$_9$H$_{11}$BrN$_4$OS | 35.7 | 3.64 | 18.5 | 35.7 | 3.84 | 18.4 |
| 35 | -CH(CH$_3$)$_2$ | 93-5 | 50 | C$_9$H$_{11}$BrN$_4$OS | 35.7 | 3.64 | 18.5 | 35.8 | 3.93 | 18.7 |

31) [15 g, 53.8 mmoles] and commercial grade sodium hydrosulfide (20 g) in 400 ml of 50 percent ethanol was stirred at room temperature for 16 hours. At the end of this time, the mixture was warmed to 60° and the solution acidified to pH 1 by the addition of 6N hydrochloric acid. The precipitated solids were separated by filtration, washed with water, and recrystallized from aqueous ethanol to afford 13.9 g (94 percent) of analytically pure 3-bromo-7-mercapto-5-methylthiopyrazolo[1,5a]1,3,5-triazine (Compound 36) that had a melting point of 203°-205° (dec).

Anal. Calc'd for C$_6$H$_5$BrN$_4$S$_2$: C, 26.0; H, 1.83; N, 20.20.

Found: C, 26.0; H, 1.80; N, 20.05.

EXAMPLE XXXI

PREPARATION OF 7-ALKYLTHIO-3-BROMO-5-METHYLTHIOPYRAZOLO [1,5a]1,3,5-TRIAZINES (COMPOUNDS 37 – 40)
GENERAL PROCEDURE

A solution of 3-bromo-7-mercapto-5-methylthiopyrazolo[1,5a]1,3,5-triazine (Compound 36) [2.77 g, 10 mmoles], alkyl iodide (10 mmoles), and 0.3 ml of concentrated ammonium hydroxide in 200 ml of methanol was refluxed for 1 hour and then evaporated to dryness. Recrystallization of the residue from n-heptane afforded the analytically pure products listed in Table III.

TABLE III

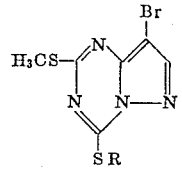

| Compound number | R | M.P. (° C.) | Yield, percent | Empirical formula | Calcd. C | Calcd. H | Calcd. N | Found C | Found H | Found N |
|---|---|---|---|---|---|---|---|---|---|---|
| 37 | —CH$_3$ | 148-9 | 45 | C$_7$H$_7$BrN$_4$S$_2$ | 28.9 | 2.41 | 19.2 | 29.1 | 2.41 | 19.2 |
| 38 | —CH$_2$—CH$_3$ | 119-21 | 48 | C$_8$H$_9$BrN$_4$S$_2$ | 31.4 | 2.96 | 18.4 | 31.7 | 3.00 | 18.3 |
| 39 | —CH$_2$—CH$_2$—CH$_3$ | 59-61 | 46 | C$_9$H$_{11}$BrN$_4$S$_2$·H$_2$O | 32.1 | 3.86 | 16.6 | 32.0 | 3.88 | 16.6 |
| 40 | —CH$_2$—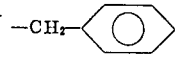 | 123-5 | 41 | C$_{13}$H$_{11}$BrN$_4$S | 42.5 | 3.00 | 15.2 | 42.6 | 3.07 | 15.0 |

EXAMPLE XXXII

PREPARATION OF 3-BROMO-5-METHYLTHIO-7-SUBSTITUTEDAMINOPYRAZOLO [1,5a]1,3,5-TRIAZINES (COMPOUNDS 41 THROUGH 53)
GENERAL PROCEDURE

A solution of 3-bromo-7-chloro-5-methylthiopyrazolo[1,5a]1,3,5-triazine (Compound 31) [2.79 g, 10 mmoles] and substituted amine (20 mmoles) in 30 ml of ethanol was stirred at room temperature for 1 hour and then evaporated to dryness in vacuo. The residue was titurated with cold water and then recrystallized from the solvent listed in Table IV.

TABLE IV

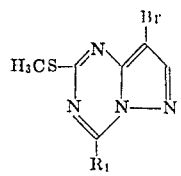

| Compound number | R$_1$ | Recrystallization solvent | Yield, percent | M.P. (° C.) | Empirical Formula | Calcd. C | Calcd. H | Calcd. N | Found C | Found H | Found N |
|---|---|---|---|---|---|---|---|---|---|---|---|
| 41 | NH—CH$_3$ | Water-ethanol | 69 | 210-2 | C$_7$H$_8$BrN$_5$S | 30.7 | 2.90 | 25.6 | 30.8 | 3.06 | 25.4 |
| 42 | NH—NH$_2$ | do | 76 | 217 | C$_6$H$_7$BrN$_6$S | 26.2 | 2.55 | 30.6 | 26.5 | 2.57 | 30.6 |
| 43 | NH—CH$_2$—CH$_3$ | do | 90 | 93-5 | C$_8$H$_{10}$BrN$_5$S | 33.2 | 3.48 | 24.3 | 33.5 | 3.71 | 24.3 |
| 44 | NH—(CH$_2$)$_2$—CH$_3$ | Ethylacetate-hexane | 85 | 88-90 | C$_9$H$_{12}$BrN$_5$S | 35.8 | 4.00 | 23.2 | 36.0 | 3.80 | 23.0 |
| 45 | NH—N(CH$_3$)$_2$ | Water-ethanol | 56 | 122-3 | C$_8$H$_{11}$BrN$_6$S | 31.7 | 3.60 | 27.8 | 31.9 | 3.65 | 27.8 |

TABLE IV – Continued

| Compound number | R₁ | Recrystallization solvent | Yield, percent | M.P. (°C.) | Empirical Formula | Calcd. C | Calcd. H | Calcd. N | Found C | Found H | Found N |
|---|---|---|---|---|---|---|---|---|---|---|---|
| 46 | NH—(CH₂)₃—CH₃ | ...do... | 63 | 87–9 | C₁₀H₁₄BrN₅S | 38.0 | 4.40 | 22.2 | 38.1 | 4.50 | 22.0 |
| 47 | —N⟨⟩ (piperidino) | ...do... | 76 | 126–7 | C₁₁H₁₄BrN₅S | 40.3 | 4.28 | 21.4 | 40.3 | 4.31 | 21.2 |
| 48 | —N⟨⟩O (morpholino) | Water-ethanol | 73 | 164–6 | C₁₀H₁₂BrN₅OS | 36.4 | 3.60 | 21.2 | 36.5 | 3.68 | 21.0 |
| 49 | —NH—(CH₂)₄—CH₃ | ...do... | 52 | 65–7 | C₁₁H₁₆BrN₅S·½H₂O | 38.9 | 5.01 | 20.6 | 38.9 | 5.05 | 20.6 |
| 50 | —NH—(CH₂)₅—CH₃ | Pet. ether (60–90°) | 61 | 57–8 | C₁₂H₁₈BrN₅S | 42.1 | 5.25 | 20.4 | 42.1 | 5.49 | 20.3 |
| 51 | —NH—CH₂— | Methanol | 43 | 120–2 | C₁₃H₁₂BrN₅S | 44.7 | 3.43 | 20.0 | 44.6 | 3.54 | 19.7 |
| 52 | NH—(CH₂)₆—CH₃ | Pet. ether (60–90°) | 62 | 58–60 | C₁₃H₂₀BrN₅S | 43.6 | 5.60 | 19.6 | 43.4 | 5.71 | 19.3 |
| 53 | NH—(CH₂)₇—CH₃ | Heptane | 59 | 64–6 | C₁₄H₂₂BrN₅S | 45.2 | 5.90 | 18.8 | 45.2 | 5.72 | 18.7 |

¹ Dec.

EXAMPLE XXXIII

PREPARATION OF 5-METHYLTHIOPYRAZOLO[1,5a]1,3,5-TRIAZINE (COMPOUND 54)

ethanol afforded 350 mg (90 percent) of analytically pure 5-hydrazino-7-methylpyrazolo[1,5a]1,3,5-triazine (Compound 57) that had a melting point of 265°–266°.

Anal. Calc'd for C₆H₈N₆: C, 43.89; H, 4.91; N, 51.20.

Found: C, 43.92; H, 5.18; N, 51.25.

EXAMPLE XXXVII

PREPARATION OF 5-METHYLTHIO-TRIAZOLO[3,4g]PYRAZOLO[1,5a]1,3,5-TRIAZINE (COMPOUND 58)

A solution of 7-hydrazino-5-methylthiopyrazolo[1,5a]1,3,5-triazine (Compound 19) [1.5 g, 7.6 mmoles] in 15 ml of diethoxymethylacetate was heated at 80° for 10 minutes. The voluminous precipitate was separated by filtration and washed with ethylacetate. Recrystallization from a mixture of dimethylformamide and toluene afforded 1.2 g (78 percent) of analytically pure 5-methylthiotriazolo[3,4g]pyrazolo[1,5a]1,3,5-triazine (Compound 58) that had a melting point of 260°–261°.

Anal. Calc'd for C₇H₆N₆S: C, 40.78; H, 2.93; N, 40.77; S, 15.52.

Found: C, 40.59; H, 3.15; N, 40.53; S, 15.25

EXAMPLE XXXVIII

PREPARATION OF 5-HYDRAZINOTRIAZOLO[2,3g]PYRAZOLO[1,5a]1,3,5-TRIAZINE (COMPOUND 59)

A suspension of 5-methylthiotriazolo[3,4g]pyrazolo[1,5a]1,3,5-triazine (Compound 58) [510 mg, 2.5 mmoles] and 0.15 ml of 85 percent hydrazine hydrate in 25 ml of absolute methanol was stirred and heated at reflux for 16 hours. Filtration of the hot reaction mixture afforded 300 mg (63 percent) of analytically pure 5-hydrazinotriazolo[2,3g]pyrazolo[1,5a]1,3,5-triazine (Compound 59) that had a melting point of 278°–280°.

Anal. Calc'd for C₆H₆N₈: C, 37.89; H, 3.18; N, 58.93.

Found: C, 37.95; H, 3.46; N, 58.89.

EXAMPLE XXXIX

The compounds of this invention have been tested for their ability to inhibit action of the enzyme phosphodiesterase, and the results are shown in the table which follows.

3',5'-cyclic AMP phosphodiesterase (PDE) has been isolated and purified from two different tissues in the following manner. Homogenates of beef heart and rabbit lung were made in sucrose-Tris-magnesium buffer and were subjected to centrifugation at low speed to remove nuclei and cell debris. The supernatants were then centrifuged at 105,000x g for 30 minutes. The 105,000x g supernatants were then fractionated using (NH₄)₂SO₄. The precipitation which formed at 0–30 percent saturation was collected by centrifugation at 20,000x g and dissolved in Tris-magnesium buffer and dialyzed overnight against the same buffer. A second (NH₄)₂SO₄ fraction was obtained by raising the concentration of the first supernatant to 50 percent. These two (NH₄)₂SO₄ fractions as well as the supernatant from the 30–50 percent cut were then assayed for PDE activity using the method of Appleman, Biochemistry 10, 311 (1971). The first fraction obtained from heart A mixture of 7-chloro-5-methylthiopyrazolo[1,5a]1,3,5-triazine (Compound 10) [6.0 g, 30 mmoles], 5 percent palladium on charcoal catalyst (5.0 g), and calcium oxide (1.2 g) in 300 ml of isopropyl alcohol was hydrogenated in a Parr apparatus at an initial pressure of 4 atmosphere of hydrogen. After hydrogen uptake had stopped (16 hours), the mixture was evaporated to dryness. The residue was extracted with boiling n-heptane 2 (400 ml), and the combined n-heptane extracts on cooling deposited 2.1 g of analytically pure 5-methylthiopyrazolo[1,5a]1,3,5-triazine (Compound 54) that had a melting point of 141°–143°.

Evaporation of the n-heptane filtrate afforded 1.4 g of crude product which was purified by column chromatography on silica gel (75 g) utilizing chloroform as the solvent. Evaporation of the chloroform eluate afforded 700 mg of analytically pure 5-methylthiopyrazolo[1,5a]1,3,5-triazine (Compound 54) that had a melting point of 141°–143°. The total yield was 2.80 g (56 percent).

Anal. Calc'd for C₆H₆N₄S: C, 43.37; H, 3.64; N, 33.73; S, 19.26

Found: C, 43.11; H, 3.62; N, 33.49; S, 19.34.

EXAMPLE XXXIV

PREPARATION OF S-METHYL-N-[3-PYRAZOLYL]THIOUREA (COMPOUND 55)

A solution of 5-methylthiopyrazolo[1,5a]1,3,5-triazine (Compound 54) [830 mg, 5 mmoles] in 10 ml of 0.5N sodium hydroxide was stirred at room temperature for 16 hours. The mixture was evaporated to dryness in vacuo at room temperature and the residue was extracted with hot ethylacetate. On cooling, the ethylacetate extract deposited 550 mg (71 percent) of analytically pure 5-methyl-N-[3-pyrazolyl]thiourea (Compound 55) that had a melting point of 92°–94°.

Anal. Calc'd for $C_5H_8N_4S$: C, 38.46; H, 5.16; N, 35.88; S, 20.49.

Found: C, 38.46; H, 5.18; N, 36.00; S, 20.55.

EXAMPLE XXXV

PREPARATION OF 7-METHYL-5-METHYLTHIOPYRAZOLO[1,5a]1,3,5-TRIAZINE (COMPOUND 56)

A solution of S-methyl-N-[3-pyrazolyl]thiourea (Compound 55) [200 mg, 1.28 mmoles] in 5 ml of triethylorthoformate was heated at reflux for 24 hours. At the end of this time, the solution was evaporated to dryness, and the residue recrystallized from n-hexane to afford 120 mg (56 percent) of analytically pure 7-methyl-5-methylthiopyrazolo[1,5a]1,3,5-triazine (Compound 56) that had a melting point of 126°–128°.

Anal. Calc'd for $C_6H_8N_4S$: C, 46.66; H, 4.48; N, 31.10; S, 17.76.

Found: C, 46.53; H, 4.35; N, 31.23; S, 17.81.

EXAMPLE XXXVI

PREPARATION OF 5-HYDRAZINO-7-METHYL-PYRAZOLO[1,5a]1,3,5-TRIAZINE (COMPOUND 57)

A solution of 7-methyl-5-methylthiopyrazolo[1,5a]1,3,5-triazine (Compound 56) [400 mg, 2.38 mmoles] and 0.14 ml of 85 percent hydrazine hydrate in 15 ml of absolute ethanol was heated at reflux for 16 hours. Evaporation of this solution, and recrystallization of the residue from aqueous and lung tissues was found to contain a PDE with low affinity for 3'5' -cyclic AMP (high Km). The second fraction was found to exhibit a biphasic curve when the Lineweaver-Burk method of analysis was used. This indicates either the presence of two separate enzymes, one having a high and the other a low affinity for the enzymes, or one protein with two separate sites. Appleman, supra, indicates that extracts of brain yield two separate enzymes (a high Km and a low Km) which can be separated by sepharose gel chromatography.

All of the inhibitory studies reported here were performed with the high affinity (Fraction II, low Km) enzyme obtained from beef heart and rabbit lung. $I_{50}$ values were calculated in some instances from a plot of log I vs. percent I in experiments in which inhibitor concentration was varied over a wide range, at a constant 3',5'-cyclic AMP concentration of approximate $1.7 \times 10^{-7}M$. The relative inhibitory activity of each compound as compared with theophylline is expressed as an α value. This value is obtained by dividing the $I_{50}$ value for theophylline in a particular experiment by the $I_{50}$ value obtained for the particular compound being evaluated. In most instances α values were calculated from an inhibition study performed with a single concentration of test compound as long as the inhibition produced by that concentration was from 20–80 percent. In this instance an α value was calculated by dividing the

[Concentration of theophylline giving the same (X percent) inhibition] [Concentration of test substance giving (x percent) inhibition]

The validity of this method has been checked by comparing α values obtained by (1) measurements at a single concentration of inhibitor and (2) measurements at four concentrations of inhibitor ($I_{50}$ determinations). α values compared in this way have been found to agree to within 10 percent of each other.

The basic incubation mixture contained the following substances (amounts in μmoles): $^3$H-cAMP (specific activity ~2,180 cmp/pmole), .00016; Tris pH 7.5, 40; $MgCl_2$, 0.5; Enzyme (cAMP phosphodiesterase), 5-50 μg protein; and $10^{-4}$ to $10^{-6}$ molar concentration of the inhibitor; incubation time 10 minutes at 30°C. At the end of incubation the mixtures are heated to 90°C for 2 minutes and 100 μg of snake venom phosphodiesterase from Crotalus atrox was added and the tubes incubated for 10 minutes at 30°C. The mixture was then cooled and 1 ml of a Dowex 1-2X, 200-400 mesh suspension, prepared by mixing 100 g of the resin in 200 g $H_2O$, was added and the mixture centrifuged. An aliquot of the supernatant was used to determine counts per minute using a liquid scintillation spectrometer. Zero time values were obtained using incubations in which the cAMP phosphodiesterase was omitted from the first incubation.

TABLE V 3,5,7-Trisubstitutedpyrazolo[1,5a]pyrimidines as Inhibitors of 3',5'-Cyclic AMP Phosphodiesterases

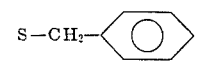

| Compound number | $R_2$ | $R_1$ | $R_3$ | αLung | αHeart |
|---|---|---|---|---|---|
| 11 | $SCH_3$ | $NH_2$ | H | 2.9 | 1.1 |
| 12 | $SCH_3$ | $N(CH_2-CH_3)_2$ | H | 19.0 | 12.0 |
| 13 | $SCH_3$ | $NH(CH_2)_2-CH_3$ | H | 12.0 | 5.8 |
| 14 | $SCH_3$ | $OCH_3$ | H | 0.6 | 0.5 |
| 15 | $SCH_3$ | $O-(CH_2)_2-CH_3$ | H | 4.5 | 1.9 |
| 16 | $SCH_3$ | SH | H | 1.0 | 0.68 |
| 18 | $SCH_3$ | $SCH_2-CH_3$ | H | 8.0 | 3.2 |
| 19 | $SCH_3$ | $NH-NH_2$ | H | 1.6 | 0.4 |
| 20 | $SCH_3$ | $N_3$ | H | 1.1 | 1.1 |
| 22 | H | OH | H | 0.6 | 0.4 |
| 23 | H | $OCH_2CH_3$ | H | 0.1 | 0.1 |
| 24 | H | $NH_2$ | H | 0.5 | 0.3 |
| 25 | H | $NH(CH_2)_2CH_3$ | H | 2.0 | 0.3 |
| 27 | OH | OH | H | 0.1 | 0.1 |
| 28 | $SCH_3$ | $NH_2$ | Br | 10.0 | 2.0 |
| 29 | $SCH_3$ | $N(CH_2-CH_3)_2$ | Br | 22.0 | 6.2 |
| 31 | $SCH_3$ | Cl | Br | 2.0 | 0.14 |
| 32 | $SCH_3$ | OH | Br | 1.0 | 0.3 |
| 33 | $SCH_3$ | $OCH_3$ | Br | 9.0 | 3.2 |
| 34 | $SCH_3$ | $O(CH_2)_2CH_3$ | Br | 2.7 | 0.7 |
| 35 | $SCH_3$ | $O-CH(CH_3)_2$ | Br | 15.0 | 4.0 |
| 36 | $SCH_3$ | SH | Br | 5.4 | 1.6 |
| 37 | $SCH_3$ | $SCH_3$ | Br | 5.0 | 1.5 |
| 38 | $SCH_3$ | $SCH_2-CH_3$ | Br | 13.0 | 2.6 |
| 39 | $SCH_3$ | $S(CH_2)_2-CH_3$ | Br | (*) | (*) |
| 40 | $SCH_3$ | $S-CH_2-\langle \bigcirc \rangle$ | Br | (*) | (*) |
| 41 | $SCH_3$ | $-NHCH_3$ | Br | (*) | (*) |
| 42 | $SCH_3$ | $-NH-NH_2$ | Br | (*) | (*) |
| 43 | $SCH_3$ | $NH-CH_2-CH_3$ | Br | 40.0 | 8.0 |
| 44 | $SCH_3$ | $NH(CH_2)_2-CH_3$ | Br | 67.0 | 8.0 |
| 45 | $SCH_3$ | $NH-N(CH_3)_2$ | Br | 3.1 | 1.2 |
| 46 | $SCH_3$ | $NH(CH_2)_3-CH_3$ | Br | 160.0 | 12.5 |

TABLE V (CONT'D)

| Cmpd. No. | R₂ | R₁ | R₃ | αLung | αHeart |
|---|---|---|---|---|---|
| 47 | SCH₃ |  | Br | (a) | (a) |
| 48 | SCH₃ |  | Br | (a) | (a) |
| 49 | SCH₃ | —NH(CH₂)₄—CH₃ | Br | (a) | (a) |
| 50 | SCH₃ | —NH(CH₂)₅—CH₃ | Br | (a) | (a) |
| 51 | SCH₃ |  | Br | (a) | (a) |
| 52 | SCH₃ | —NH(CH₂)₆—CH₃ | Br | (a) | (a) |
| 53 | SCH₃ | —NH(CH₂)₇—CH₃ | Br | (a) | (a) |
| 56 | SCH₃ | CH₃ | H | 1.6 | 0.0 |
| 58* | | | | (a) | (a) |
| 59** | | | | (a) | (a) | a Insoluble.
*5-methylthiotriazolo[3,4g]pyrazole[1,5a]-1,3,5-triazine.
**5-hydrazinotriazolo[2,3g]pyrazolo[1,5a]-1,3,5-triazine.

Analysis of the results shown in Table V indicates that several of the compounds of this invention possess inhibition capability significantly superior to theophylline and in some cases, as for example, Compounds 12, 13, 28, 29, 35 and 38, at least 10 times greater, with Compounds 43, 44 and 46 being respectively 40, 67 and 160 times greater with respect to rabbit lung phosphodiesterase enzyme. Moreover, these results clearly indicate that such compounds possess selective phosphodiesterase enzyme inhibitory capability. With respect to the compounds shown in Table V to be insoluble, while such compounds thus have not undergone the inhibitory test of Example XXXIX, due to similarity in structure to the tested compounds, it is expected that in vivo testing of such compounds in forms other than solution will confirm phosphodiesterase enzyme inhibitory capability. Similarly, it is to be expected that Compounds 54, 55 and 57 will demonstrate phosphodiesterase enzyme inhibitory capability due to their similarity in structure to the tested compounds.

We claim:
1. A compound of the structure:

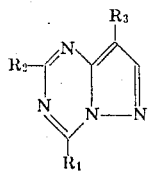

wherein $R_1$ is OH, alkoxy, halogen, SH or $SR_4$ where $R_4$ is alkyl or aralkyl, N=N=N, amine or alkylamine, $R_2$ is $SR_4$, H, alkyl or amine, and $R_3$ is H or halogen, said alkyl and aralkyl being $C_1$ to $C_8$ linear or branched alkyl or aralkyl and the aryl portion of said aralkyl is phenyl; provided that when $R_3$ is H and $R_1$ is OH, $R_2$ is not SH.

2. The compound of claim 1 in which $R_1$ is $N(R_4)_2$ and $R_2$ is $SR_4$; and $R_3$ is H.

3. The compound of claim 1 in which $R_1$ is $N(C_2H_5)_2$, $R_2$ is $SCH_3$ and $R_3$ is H.

4. The compound of claim 1 in which $R_1$ is NH $(CH_2)_2$-$CH_3$, $R_2$ is $SCH_3$, and $R_3$ is H.

5. The compound of claim 1 in which $R_1$ is $N(R_4)_2$ and $R_2$ is $SR_4$; and $R_3$ is H.

6. The compound of claim 5 in which $R_2$ is $SCH_3$ and $R_3$ is Br.

7. The compound of claim 1 in which $R_1$ is $N(R_4)_2$ and $R_2$ is $SR_4$; ; and $R_3$ is H.

8. The compound of claim 7 in which $R_1$ is $N(C_2H_5)_2$, $R_2$ is $SCH_3$ and $R_3$ is Br.

9. The compound of claim 1 in which $R_1$ is alkoxy, $R_2$ is $SR_4$ [where $R_4$ is $C_1$ to $C_8$ linear or branched alkyl or aralkyl], and $R_3$ is halogen.

10. The compound of claim 9 in which $R_1$ is O—CH $(CH_3)_2$, $R_2$ is $SCH_3$ and $R_3$ is Br.

11. The compound of claim 1 in which $R_1$ is alkoxy, $R_2$ is $SR_4$, and $R_3$ is halogen.

12. The compound of claim 11 in which $R_1$ is $SC_2H_5$, $R_2$ is $SCH_3$ and $R_3$ is Br.

13. The compound of claim 1 in which $R_1$ is $N(R_4)_2$ and $R_2$ is $SR_4$; and $R_3$ is H.

14. The compound of claim 13 in which $R_1$ is $NHC_2H_5$, $R_2$ is $SCH_3$ and $R_3$ is Br.

15. The compound of claim 1 in which $R_1$ is $N(R_4)_2$ and $R_2$ is $SR_4$; and $R_3$ is H.

16. The compound of claim 1 in which $R_1$ is $N(R_4)_2$ and $R_2$ is $SR_4$; and $R_3$ is H.

17. 3-Bromo-5-methylthio-7-ethylaminopyrazolo[1,5a]1,3,5-triazine.

18. 3-Bromo-5-methylthio-7-propylaminopyrazolo[1,5a]1,3,5-triazine.

19. 3-Bromo-5-methylthio-7-butylaminopyrazolo[1,5a]1,3,5-triazine.

* * * * *